United States Patent
Liu et al.

(10) Patent No.: US 9,977,697 B2
(45) Date of Patent: May 22, 2018

(54) TASK MANAGEMENT SYSTEM FOR A MODULAR ELECTRONIC DEVICE

(71) Applicant: Google Inc., Mountain View, CA (US)

(72) Inventors: Eric H C Liu, Redwood City, CA (US); Kevin D. Brune, Maple Valley, WA (US); Yoshimichi Matsuoka, Sunnyvale, CA (US); Gilbert Cabillic, Brece (FR); Gaurav Shah, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/130,300

(22) Filed: Apr. 15, 2016

(65) Prior Publication Data

US 2017/0300365 A1      Oct. 19, 2017

(51) Int. Cl.
G06F 9/46       (2006.01)
G06F 9/50       (2006.01)

(52) U.S. Cl.
CPC .................................. *G06F 9/5055* (2013.01)

(58) Field of Classification Search
None
See application file for complete search history.

(56) References Cited

U.S. PATENT DOCUMENTS

| | | | |
|---|---|---|---|
| 5,809,325 A | 9/1998 | Hinton et al. | |
| 6,069,911 A | 5/2000 | Sealander et al. | |
| 6,282,561 B1 | 8/2001 | Jones et al. | |
| 6,771,595 B1 | 8/2004 | Gilbert et al. | |
| 6,785,889 B1 | 8/2004 | Williams | |
| 6,941,399 B2 | 9/2005 | Loh | |
| 6,961,575 B2 | 11/2005 | Stanforth | |
| 6,968,323 B1 | 11/2005 | Bansal et al. | |
| 6,975,613 B1 | 12/2005 | Johansson | |

(Continued)

FOREIGN PATENT DOCUMENTS

| | | |
|---|---|---|
| EP | 1 197 858 | 4/2002 |
| EP | 2073463 | 6/2009 |
| EP | 2749200 | 7/2014 |

OTHER PUBLICATIONS

International Search Report for PCT/US2016/062667 dated Mar. 8, 2017, 13 pages.

(Continued)

*Primary Examiner* — Gregory A Kessler
(74) *Attorney, Agent, or Firm* — Dority & Manning, P.A.

(57) ABSTRACT

Systems and methods are provided for managing task performance for a modular electronic device. In one implementation, a modular electronic device can include one or more electronic modular components. The modular electronic device can identify a computational task associated with the modular electronic device and identify one or more computing devices that are available to perform at least a portion of the computational task. The modular electronic device can obtain one or more sets of data associated with one or more computational resources of the computing devices. The modular electronic device can determine a potential benefit to the modular electronic device associated with the performance of the computational task by the computing devices. The modular electronic device can perform at least a portion of the computational task with the computing devices based, at least in part, on the sets of data associated with the computational resources and the potential benefit.

20 Claims, 5 Drawing Sheets

(56) References Cited

U.S. PATENT DOCUMENTS

| | | |
|---|---|---|
| 7,009,939 B2 | 3/2006 | Baker et al. |
| 7,043,225 B1 | 5/2006 | Patel et al. |
| 7,058,387 B2 | 6/2006 | Kumar et al. |
| 7,184,759 B2 | 2/2007 | Date et al. |
| 7,257,632 B2 | 8/2007 | Zhang et al. |
| 7,340,759 B1 | 3/2008 | Rodriguez |
| 7,346,354 B2 | 3/2008 | Patel |
| 7,463,890 B2 | 12/2008 | Herz et al. |
| 7,489,656 B2 | 2/2009 | Guo et al. |
| 7,618,260 B2 | 11/2009 | Daniel et al. |
| 7,689,681 B1 | 3/2010 | David |
| 7,720,968 B2 | 5/2010 | Clark, Jr. et al. |
| 7,788,133 B2 | 8/2010 | Delenda |
| 8,027,684 B2 | 9/2011 | Gupta et al. |
| 8,028,057 B2 | 9/2011 | David |
| 8,156,500 B2 | 4/2012 | Helander |
| 8,185,909 B2 | 5/2012 | Sigal et al. |
| 8,249,984 B2 | 8/2012 | Dawson et al. |
| 8,276,143 B2 | 9/2012 | Vengerov et al. |
| 8,296,770 B2 | 10/2012 | Ohno |
| 8,320,414 B2 | 11/2012 | Dawson et al. |
| 8,355,670 B2 | 1/2013 | White |
| 8,424,007 B1 | 4/2013 | Hernacki et al. |
| 8,520,535 B2 | 8/2013 | Dawson et al. |
| 8,667,065 B1 | 3/2014 | Odom |
| 8,694,968 B2 | 4/2014 | Eteminan et al. |
| 8,730,994 B2 | 5/2014 | Kannan et al. |
| 8,782,211 B1 | 7/2014 | Sharma |
| 8,843,933 B1 | 9/2014 | Holler et al. |
| 9,003,039 B2 | 4/2015 | Amorim |
| 9,015,708 B2 | 4/2015 | Choudhury et al. |
| 9,031,531 B2 | 5/2015 | Miluzzo et al. |
| 9,037,508 B2 | 5/2015 | Dawson et al. |
| 9,038,195 B2 | 5/2015 | Satpathy et al. |
| 9,075,659 B2 | 7/2015 | Barzel et al. |
| 9,078,274 B2 | 7/2015 | Guo |
| 9,083,819 B2 | 7/2015 | Chan |
| 9,118,750 B2 | 8/2015 | Vossoughi |
| 9,148,473 B1 | 9/2015 | Sharma |
| 9,229,781 B2 | 1/2016 | Karaoguz et al. |
| 9,241,304 B2 | 1/2016 | Dawson et al. |
| 2002/0058499 A1 | 5/2002 | Ortiz |
| 2003/0139199 A1 | 7/2003 | Kinnula et al. |
| 2003/0217129 A1 | 11/2003 | Knittel et al. |
| 2004/0111308 A1 | 6/2004 | Yakov |
| 2004/0128262 A1 | 7/2004 | Nafousi |
| 2004/0156312 A1 | 8/2004 | Salonidis et al. |
| 2004/0165548 A1 | 8/2004 | Backes |
| 2004/0203820 A1 | 10/2004 | Billhartz |
| 2006/0007955 A1 | 1/2006 | Kotzin |
| 2006/0167784 A1 | 7/2006 | Hoffberg |
| 2006/0168571 A1 | 7/2006 | Ghiasi et al. |
| 2007/0179829 A1 | 8/2007 | Laperi et al. |
| 2007/0230421 A1 | 10/2007 | Roadknight |
| 2007/0294692 A1 | 12/2007 | Zhao et al. |
| 2008/0040481 A1 | 2/2008 | Joshi et al. |
| 2008/0298284 A1 | 12/2008 | Dawson et al. |
| 2008/0298314 A1 | 12/2008 | Dawson et al. |
| 2008/0300890 A1 | 12/2008 | Dawson et al. |
| 2008/0301017 A1 | 12/2008 | Dawson et al. |
| 2008/0313642 A1 | 12/2008 | Karaoguz et al. |
| 2009/0025004 A1 | 1/2009 | Barnard et al. |
| 2009/0106730 A1 | 4/2009 | Mockford |
| 2009/0180430 A1 | 7/2009 | Fadell |
| 2009/0228888 A1 | 9/2009 | Vengerov et al. |
| 2009/0271324 A1 | 10/2009 | Jandhyala et al. |
| 2010/0223385 A1 | 9/2010 | Gulley et al. |
| 2010/0251259 A1 | 9/2010 | Howard |
| 2010/0332262 A1 | 12/2010 | Horvitz et al. |
| 2011/0288905 A1 | 11/2011 | Mrakas |
| 2011/0320233 A1 | 12/2011 | Arnette et al. |
| 2012/0079097 A1 | 3/2012 | Gopisetty et al. |
| 2012/0324111 A1 | 12/2012 | Barzel et al. |
| 2013/0042004 A1 | 2/2013 | Boss et al. |
| 2013/0237147 A1 | 9/2013 | Dearman |
| 2013/0262644 A1 | 10/2013 | Hintermeister et al. |
| 2014/0067496 A1 | 3/2014 | Buswell |
| 2014/0195683 A1 | 7/2014 | Ammerman, III et al. |
| 2014/0307635 A1 | 10/2014 | Agrawal et al. |
| 2015/0026336 A1 | 1/2015 | Suchter et al. |
| 2015/0067022 A1 | 3/2015 | Subbiah |
| 2015/0074635 A1 | 3/2015 | Margiotta et al. |
| 2015/0081877 A1 | 3/2015 | Sethi et al. |
| 2015/0195011 A1 | 7/2015 | Birgel et al. |
| 2015/0206228 A1 | 7/2015 | Perez et al. |
| 2015/0358790 A1 | 12/2015 | Nasserbakht |

OTHER PUBLICATIONS

Haojun et al. "Task Scheduling Prediction Algorithms for Dynamic Hardware/Software Partitioning", 2012 Fifth International Symposium on Parallel Architectures, Algorithms and Programming, Dec. 17, 2012, pp. 80-85.

PCT International Search Report for corresponding PCT Application No. PCT/2016/062457, dated Feb. 27, 2017—3 pages.

Written Opinion of the International Preliminary Examining Authority for PCT/US2016/062457 dated Mar. 2, 2018, 7 pages.

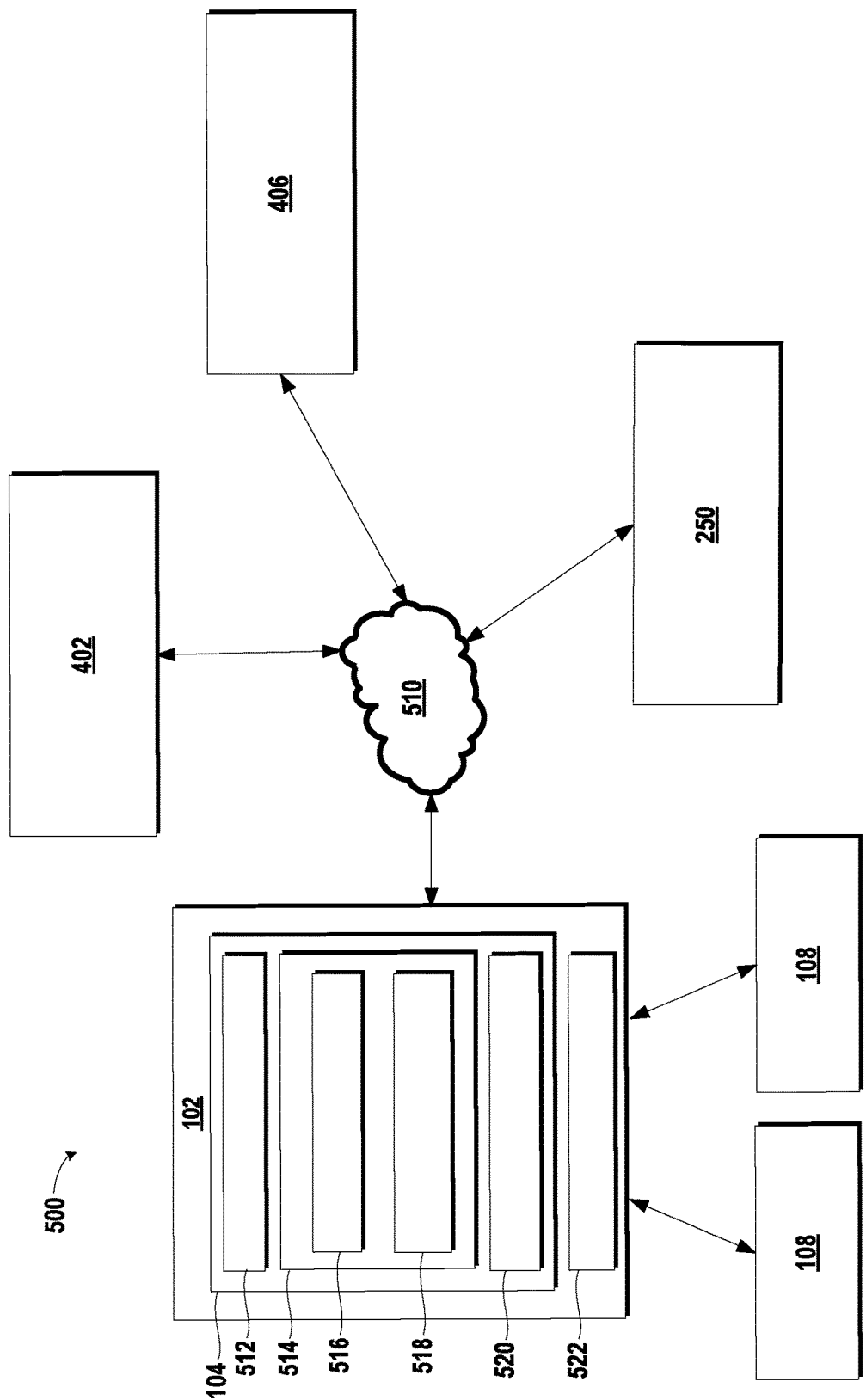

TASK MANAGEMENT SYSTEM FOR A MODULAR ELECTRONIC DEVICE

FIELD

The present disclosure relates generally to ad hoc combinations of modular devices and, more particularly, to managing the performance of computational tasks associated with modular devices.

BACKGROUND

Modular systems can have multiple different components or devices, e.g., called modules. Different modules of a modular system may be capable of a specialized function and/or one or more general functions. Some modules may include specialized modules that can perform one or more specific functions, such as a camera module, a battery module, etc. In some examples, the specific functions may include capturing an image, supplying power, etc. Other modules may have the capability to perform general functions such as, performing a processing task, utilizing communication bandwidth, etc.

Modules may be combined with other modules or devices, or otherwise repurposed for other functionality. In some examples, such combination may utilize physical connection, by attaching modules to each other. In other examples, combinations of modules may utilize unconnected devices, e.g., over wireless communication links.

SUMMARY

Aspects and advantages of the present disclosure will be set forth in part in the following description, or can be obvious from the description, or can be learned through practice of embodiments of the present disclosure.

One example aspect of the present disclosure is directed to a modular electronic device. The modular electronic device can include one or more electronic modular components. The modular electronic device can be configured to identify a computational task associated with the modular electronic device. The modular electronic device can be further configured to identify one or more computing devices that are available to perform at least a portion of the computational task. The modular electronic device can be configured to obtain one or more sets of data associated with one or more computational resources of one or more of the computing devices. The sets of data can be indicative of at least one of a communication capability, a processing capability, and a storage capability associated with one or more of the computing devices. The modular electronic device can be further configured to determine a potential benefit to the modular electronic device associated with the performance of the computational task by one or more of the computing devices. The modular electronic device can be configured to determine whether to perform at least a portion of the computational task with one or more of the computing devices based at least in part on the one or more sets of data associated with the one or more computational resources and the potential benefit to the modular electronic device.

Another example aspect of the present disclosure is directed to a computer-implemented method of managing task performance for a modular electronic device. The method can include identifying, by one or more electronic modular components of a modular electronic device, a computational task associated with the modular electronic device. The method can further include identifying, by the one or more electronic modular components, one or more computing devices that are available to perform at least a portion of the computational task. The computing devices can be associated with at least one electronic device that is different from the modular electronic device. The method can include obtaining, by the one or more electronic modular components, one or more sets of data associated with one or more computational resources of one or more of the computing devices. The sets of data can be indicative of at least one of a communication capability, a processing capability, or a storage capability associated with one or more of the computing devices. The method can further include determining, by the one or more electronic modular components, a potential benefit to the modular electronic device associated with the performance of the computational task by one or more of the computing devices. The method can include determining, by the one or more electronic modular components, whether to perform at least the portion of the computational task with one or more of the computing devices based at least in part on the one or more sets of data associated with the one or more computational resources and the potential benefit to the modular electronic device.

Yet another example aspect of the present disclosure is directed to an electronic modular component for a modular electronic device. The electronic modular component can include a module housing. The electronic modular component can further include one or more processors included in the module housing and one or more memory devices included in the module housing. The one or more memory devices can store computer readable instructions that when executed by the one or more processors, cause the one or more processors to perform operations. The operations can include identifying a computational task. The operations can further include obtaining one or more sets of data indicative of at least one of a communication capability, a processing capability, or a storage capability associated with one or more computing devices that are available to perform at least a portion of the computational task. The operations can include determining whether to have at least the portion of the computational task performed by the one or more computing devices based at least in part on the one or more sets of data.

Other example aspects of the present disclosure are directed to systems, apparatuses, tangible, non-transitory computer-readable media, user interfaces, memory devices, and electronic devices for managing the performance of computational tasks associated with a modular device.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling description of the present disclosure, directed to one of ordinary skill in the art, is set forth in the specification, which makes reference to the appended figures, in which:

FIG. 5 depicts an example system according to example embodiments of the present disclosure.

DETAILED DESCRIPTION

Figure 1:
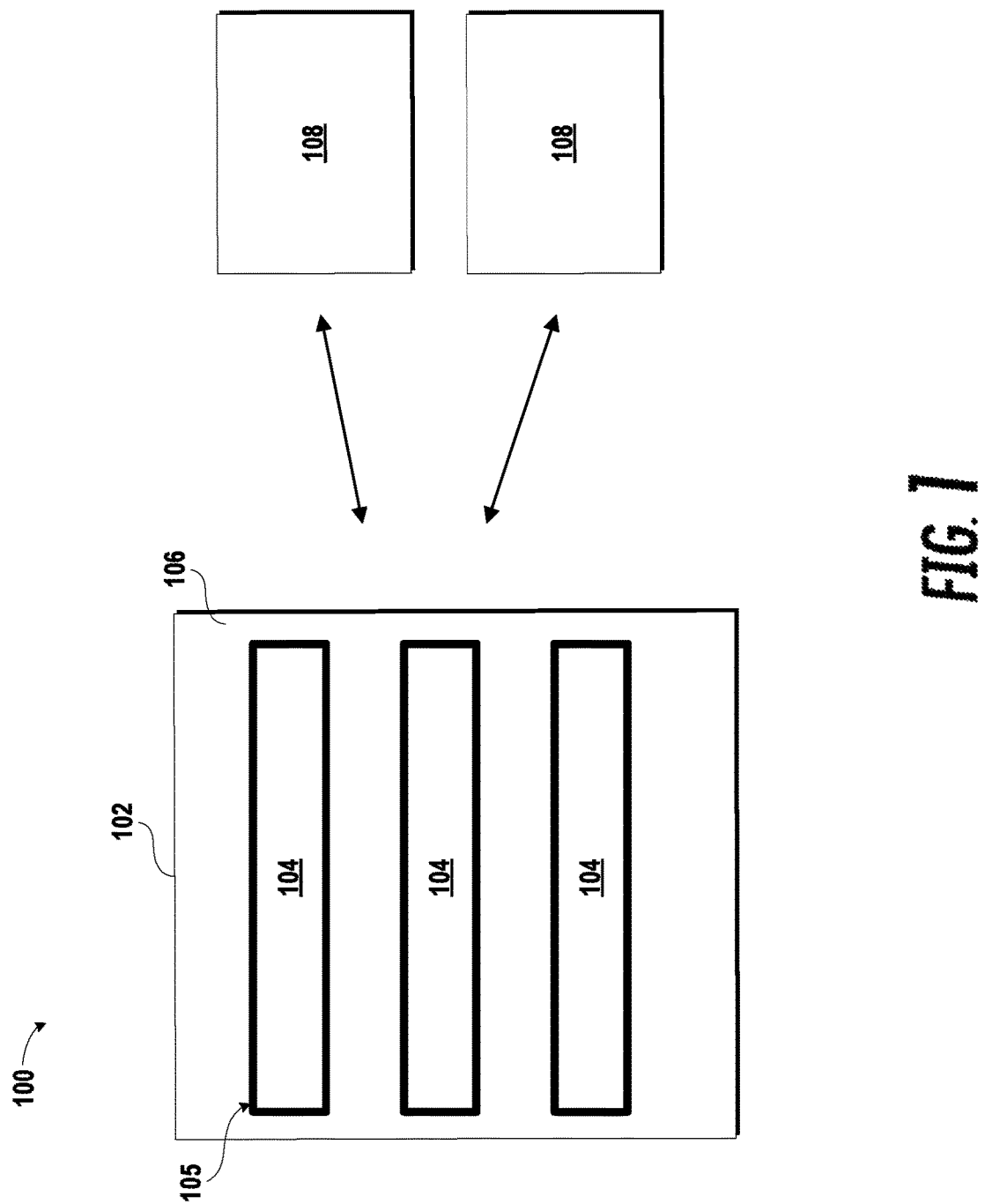
FIG. 1 depicts a modular entity system according to example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to managing the performance of computational tasks associated with a modular electronic device. A modular electronic device can be configured to select specific computational tasks and manage the performance of such tasks by one or more additional computing device(s) that are communicatively connected to the modular electronic device. For instance, the modular electronic device can identify a computational task, such as a data archiving procedure. In addition, the modular electronic device can identify one or more computing device(s) that are available to potentially perform, at least a portion of, the data archiving procedure. These computing device(s) can be other electronic devices (e.g., laptops, desktops, game systems. other electronic modular components) that are in proximity of the modular electronic device and/or communicatively connected to the modular electronic device (e.g., over a local area network such as an ad-hoc local area network). The modular electronic device can obtain respective sets of data that describe the computational resources (e.g., communication interfaces, processors, memory devices) of the respective computing device(s). These sets of data can indicate, for example, a communication capability, a processing capability, and/or a storage capability associated with each of the computational resources that can be used to perform, at least a portion of, the data archiving procedure. The modular electronic device can also determine a potential benefit associated with performing the computational task. For example, a data archiving procedure can reduce primary storage consumption by the modular electronic device. Based, at least in part, on the capabilities of the available computational resources and/or the potential benefit, the modular electronic device can determine whether to perform, at least a portion of, the data archiving procedure with one or more of the computing device(s). In this way, the modular electronic device can determine whether a computational task would be beneficial in view of available computing device(s) and their associated computational resources and can selectively coordinate the performance of the task (or at least a portion of the task) by such available computing device(s).

More particularly, in one example, a modular electronic device can include one or more electronic modular component(s). The one or more electronic modular component(s) can communicate (e.g., via Bluetooth protocol, near-field communication, a Wi-Fi network, etc.) with other computing device(s). For example, the electronic modular component(s) can communicate with servers, processors, memory devices, other electronic modular component(s), etc. associated with other electronic devices, such as centralized server systems, telephones, laptops, desktops, game systems, etc. Moreover, one or more of the electronic modular component(s) can be configured to manage the performance of one or more computational tasks associated with the electronic modular device.

For instance, one or more of the electronic modular component(s) can identify a computational task associated with the modular electronic device. The computational task can be, for example, a maintenance task that is scheduled to occur during a set time period. In some implementations, the computational task can include encoding, encryption, secure storage, specialized sensing (e.g., temperature, gas, biometric), communication pass through (e.g., using network associated with one device to communicate with another), etc. The computational task can include, for example, a data archiving procedure that has been scheduled by a user to occur annually. In some implementations, the electronic modular component(s) can receive a communication from a computing device advertising a computational task (e.g., a data encryption/decryption procedure) when the electronic modular component(s) are within a communication range of the computing device.

The electronic modular component(s) can identify one or more computing device(s) that may be available to potentially perform, at least a portion of, the computational task. For instance, the electronic modular component(s) can send a request to the computing device(s) within communication range of the electronic modular component(s). The requests can inquire as to whether the computing device(s) are available to perform, at least a portion of, the data archiving procedure. In response, the computing device(s) can send, to the electronic modular component(s), information indicating the computing device(s)' availability to perform the data archiving procedure.

In some implementations, the electronic modular component(s) can receive communications from the computing device(s), without first making a request. These communications can advertise the computing device(s)' availability to perform certain computational tasks. For example, a laptop computer can send a communication to the electronic modular component(s) indicating that the laptop computer is available to perform a data encryption/decryption procedure.

The electronic modular component(s) can obtain data associated with the computational resources of the available computing device(s). For instance, each computing device can include one or more computational resource(s), such as, a communication interface, a processor, and/or a memory device. A communication capability of the computing device can indicate a bandwidth, a distance, a protocol, etc. associated with the communication interface of the computing device. A processing capability of a computing device can indicate a speed at which the processors of the computing device can process a computational task. A storage capability of a computing device can indicate the amount of storage, speed of storage, etc. associated with the memory devices of the computing device. Upon request and/or via advertisement, the electronic modular component(s) can obtain one or more set(s) of data that are indicative of a communication capability (e.g., Bluetooth, up to 20 m, at a rate of X kbps), a processing capability (e.g., Y GHz for archiving data), and a storage capability (e.g., Z GB) associated with one or more of the computing device(s). In some implementations, the one or more set(s) of data can be indicative of a price associated with using the computational resources of a computing device to perform the computational task.

The electronic modular component(s) can determine a potential benefit to the modular electronic device associated with the performance of the computational task by the computing device(s). In some implementations, the potential benefit to the modular electronic device can include an increase in the communication capability, the processing capability, and/or the storage capability associated with the modular electronic device. Additionally and/or alternatively, the potential benefit of the computational task can be a financial benefit (e.g., an increase in dollars of a bank account). Furthermore, the potential benefit can include stopping or delaying a computational task by one or more of the computing device(s).

The electronic modular component(s) can use the sets of data to determine whether to perform, at least a portion of, a computational task with the computing device(s). For instance, the electronic modular component(s) can determine whether it would be beneficial to perform the computational task using the computational resources of the computing device(s). In some implementations, the electronic modular component(s) can determine a first score associated with one or more of the computing device(s). The first score can be based, at least in part, on the one or more set(s) of data associated with the computational resources of the computing device(s). The first score can be indicative of the amount of resources that would be required for the computing device(s) to perform at least a portion of the task. For example, the first score can indicate the amount of communication, processing, and/or storage resources that would be required to perform the data archiving procedure.

The electronic modular component(s) can determine a second score associated with the computational task. The second score can be based, at least in part, on the potential benefit to the modular electronic device associated with the performance of the computational task. By way of example, the second score associated with a data archiving procedure can be based, at least in part, on an increase in the amount of storage available (and/or a reduction in primary storage consumption) upon completion of the data archiving procedure. In another example, in the event that the computational task is associated with a financial gain (e.g., as a result of mining bit coin), the second score can be associated with an increase in account value associated with a user of the electronic modular device after performing the task (e.g., mining bit coin).

The electronic modular component(s) can compare the first score to the second score and determine whether to perform, at least a portion of, the computational task using the computing device(s). For example, in the event that the first score (e.g., indicating the resources to be used in performing the data archiving procedure) outweighs the second score (e.g., indicating the increase in storage gained by performing the data archiving procedure), the electronic modular component(s) can determine to perform the data archiving procedure. In some implementations, a portion of the data archiving procedure can be performed by the electronic modular component(s), while another portion can be performed by the computing device(s). In other implementations, the computing device(s) can perform the entirety of the computational task.

Additionally, and/or alternatively, the electronic modular component(s) can utilize software applications of the computing device(s) to perform a computational task. For instance, the electronic modular component(s) can communicate with a computing device and remotely use the software on that computing device to perform a computational task. By way of example, the electronic modular component(s) can remotely use software of a computing device to encrypt and/or decrypt certain data. This can allow the modular electronic device to forgo adding an electronic modular component with data encryption/decryption software, when such techniques are only occasionally needed by the modular electronic device. In some implementations, the software can be made available on demand such as via a pay-per-use mechanism. Additionally, and/or alternatively, access to the software can be provided in different tiers. A first tier can provide the requesting module a more limited set of rights and/or number of uses, while a second tier can provide a more expansive set of rights and/or number of uses.

In some implementations, the electronic modular component(s) can be customized based, at least in part, on the computational tasks being performed. A central server can monitor the frequencies and types of computational tasks being performed by the electronic modular component(s) and/or the computing device(s) under the direction of the electronic modular component(s). Based, at least in part, on the frequencies and types of computational tasks, the central server can communicate with a manufacturer to have a particular type of electronic modular component created for the modular electronic device. For example, if the modular electronic device is frequently coordinating the performance of a data archiving procedure with other electronic devices, a central server can order one or more new electronic modular component(s) that are capable of performing the data archiving procedure for the modular electronic device.

In accordance with the above, and as further described below, the apparatuses, systems, and methods of the present disclosure can perform computational tasks that benefit modular electronic devices by selectively utilizing the resources of other computing device(s). Moreover, the present disclosure can expand the capability of a modular electronic device to perform computational tasks by remotely accessing the software of other computing device(s) and/or creating new electronic modular component(s) based on computational task history. Accordingly, the systems and methods of the present disclosure can help facilitate the performance of beneficial computational tasks associated with modular electronic devices.

With reference now to the figures, example aspects of the present disclosure will be discussed in greater detail. For instance, FIG. 1 depicts a modular entity system 100 according to example embodiments of the present disclosure. System 100 can include, for example, modular electronic device 102 having one or more electronic modular component(s) 104.

Electronic modular component(s) 104 can include various hardware components. For example, in some implementations, electronic modular component(s) 104 can include a module housing 105, one or more processor(s) included in module housing 105, and one or more memory device(s) included in module housing 105. The memory device(s) can be configured to store computer readable instructions that when executed by the processor(s), cause the processor(s) to perform operations for managing computational tasks associated with the modular electronic device, as further described herein.

In some implementations, electronic modular component(s) 104 can be configured to physically connect with modular electronic device 102. For example, modular electronic device 102 can include a frame 106 that can provide an endoskeleton for physically connecting electronic modular component(s) 104 to modular electronic device 102. For example, frame 106 can be configured to define a plurality of bays and each of the electronic modular component(s) 104 can be configured to be received by, at least one of, the bays.

In some implementations, electronic modular component(s) 104 can be combined with modular electronic device 102 without physical connection. For example, electronic modular component(s) 104 can be configured to communicate among each other and/or with modular electronic device 102 (e.g., using a wireless communication interface such as RF communication, Near-Field Communication, Bluetooth, WiFi, other wireless communication protocols). When communicating with other modules of modular electronic device 102, electronic modular component(s) 104 can also, and/or alternatively, be configured to utilize an inter-process communication (IPC). As such, electronic modular component(s) 104 can be combined logically to perform tasks without a physical connection between electronic modular component(s) 104.

Electronic modular component(s) 104 can be configured to communicate with one or more other computing device(s) 108. Computing device(s) 108 can include, for example, servers, processors, memory devices, other electronic modular component(s), etc. associated with other electronic devices, such as centralized server systems, telephones, laptops, desktops, game systems, etc. One or more computing device(s) 108 can be associated with one or more electronic device(s) that are physically separate from modular electronic device 102. Electronic modular component(s) 104 and computing device(s) 108 can be configured to communicate via Bluetooth protocol, near-field communication, a Wi-Fi network, other suitable networks, etc.

Different electronic modular component(s) 104 and/or computing device(s) 108 can be associated and/or owned by different entities in an environment. For instance, electronic modular component(s) 104 and/or computing device(s) 108 can be part of multiple devices that belong to the same user or to different users. By way of example, while in a room, computing device(s) 108 associated with one user (e.g., desktop computing system) can offer its computational resources to electronic modular component(s) 104, associated with another user within the room.

In some implementations, electronic modular device 102, electronic modular component(s) 104, frame 106, and/or computing device(s) 108 can be configured to advertise their respective availability and/or capabilities, and can communicate among each other to create and/or join an ad hoc network. For instance, the ad hoc network can be created based, at least in part, on a desired task to be performed. Devices can be added to the ad hoc network based, at least in part, on one or more available resource(s) and/or capabilities of the devices.

It will be appreciated that example system 100 is depicted for illustrative purposes only. In this regard, it will be further appreciated that system 100 can include various other suitable configurations without deviating from the scope of the preset disclosure. In particular, system 100 can include any suitable number of devices or components that communicate using various suitable communication techniques (e.g. physical connection, near field communication, ad hoc network, etc.). In some implementations, a modular entity can include a single electronic modular component.

Figure 2:
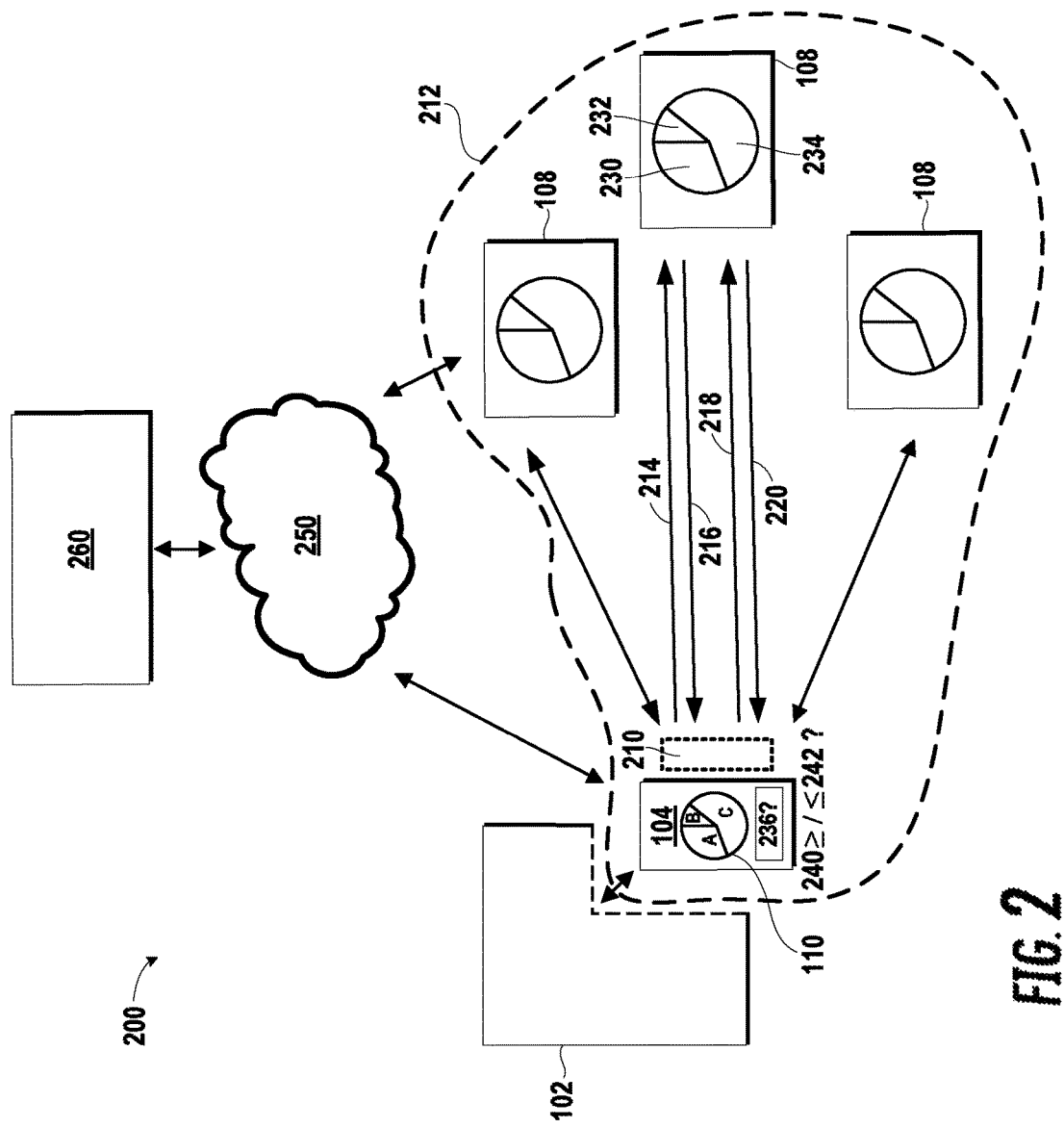
FIG. 2 depicts an example system for managing task performance for a modular electronic device according to example embodiments of the present disclosure.

FIG. 2 depicts an example system 200 for managing task performance for a modular electronic device according to example embodiments of the present disclosure. The system 200 can include modular electronic device 102 having one or more electronic modular component(s) 104, and one or more computing device(s) 108. Electronic modular component(s) 104 can be configured to manage the performance of one or more computational tasks associated with electronic modular device 102.

For instance, one or more of the electronic modular component(s) 104 can be configured to identify a computational task 210 associated with the modular electronic device 102. For instance, in some implementations, computational task 210 can include a task that has been scheduled by a user (of electronic modular device 102) to occur periodically. Computational task 210 can be a maintenance task that is scheduled to occur during a set time period. For example, computational task 210 can be a data archiving procedure associated with electronic modular device 102 that is scheduled to occur semi-annually, annually, etc.

In some implementations, electronic modular component(s) 104 can identify computational task 210 by receiving a communication from computing device(s) 108. The communication can advertise computational task 210 when electronic modular component(s) 104 are within a communication range 212 of computing device(s) 108. Communication range 212 can be associated with an ad hoc network. Communication range 212 can be, for example, a range in which electronic modular component(s) 104 and computing device(s) 108 can send and/or receive communications from one another. For example, computing device(s) 108 can send one or more communication(s) to electronic modular component(s) 104 advertising a data encryption/decryption procedure that can be performed for the modular electronic device 102, when electronic modular component(s) 104 are within communication range 212. In some implementations, computational task 210 can be specific to a particular computing device (e.g., one configured to perform certain data encryption/decryption techniques).

Electronic modular component(s) 104 can be configured to identify one or more computing device(s) 108 that are available to perform, at least a portion of, computational task 210. For instance, electronic modular component(s) 104 can be configured to determine that electronic modular component(s) 104 are in communication range 212 with one or more computing device(s) 108. One or more of the computing device(s) 108 that are within communication range 212 can be identified as available to perform, at least a portion of, computational task 210 (e.g., a data archiving procedure).

In some implementations, electronic modular component(s) 104 can be configured to request information regarding the availability of computing device(s) 108. For instance, electronic modular component(s) 104 can be configured to send one or more request(s) 214 (e.g., communications) for information indicative of an availability of one or more of the computing device(s) 108 to perform, at least a portion of, computational task 210. By way of example, request(s) 214 can inquire as to whether computing device(s) 108 are available to perform, at least a portion of, the data archiving procedure.

Computing device(s) 108 can be configured to receive request(s) 214 and determine its respective availability to perform computational task 210. In some implementations, computing device(s) 108 can be configured to determine its availability based, at least in part, on whether it has any computational resources that may be available to perform, at least a portion of, the task. For example, a computing device 108 can determine whether any of its processors and/or memory devices may be available to assist with the data archiving procedure. Computing device(s) 108 can be configured to send a response communication 216 indicating the availability of computing device(s) 108. Electronic modular component(s) 104 can be configured to receive response communication 216 including information indicative of the availability of one or more of the computing device(s) 108 to perform, at least a portion of, computational task 210.

In some implementations, electronic modular component(s) 104 can be configured to receive communication 216 from computing device(s) 108, without first making a request. In such implementations, communication 216 can advertise the availability of one or more of the computing device(s) 108 to perform certain computational tasks. For example, a laptop computer can send a communication 216 to the electronic modular component(s) 104 indicating that the laptop computer is available to perform a data encryption/decryption procedure.

Electronic modular component(s) 104 can be configured to obtain one or more set(s) of data associated with one or more computational resource(s) of one or more of the computing device(s) 108. For instance, electronic modular component(s) 104 can be configured to send one or more request(s) 218 (e.g., communications) for one or more set(s) of data associated with the one or more computational resource(s) of one or more of the computing device(s) 108. Computing device(s) 108 can be configured to receive request(s) 218 and send one or more set(s) of data 220 associated with the computational resource(s) of computing device(s) 108. Electronic modular device(s) 104 can be configured to receive the one or more set(s) of data 220 associated with the one or more computational resource(s) of one or more of the computing device(s) 108.

In some implementations, the set(s) of data 220 can be indicative of, at least one of, a communication capability 230, a processing capability 232, and/or a storage capability 234 associated with one or more of the computing device(s) 108. For instance, each computing device 108 can include one or more computational resource(s), such as, a communication interface, a processor, and/or a memory device. Communication capability 230 of a computing device 108 can indicate a bandwidth, a distance, a protocol, etc. associated with the communication interface of the respective computing device 108. Processing capability 232 of a computing device 108 can indicate a speed at which the processors of the respective computing device 108 can process a computational task. Storage capability 234 of a computing device 108 can indicate the amount of storage, speed of storage, etc. associated with the memory devices of the respective computing device 108. Upon request (e.g., 218) and/or via advertisement, electronic modular component(s) 104 can obtain one or more set(s) of data 220 that can be indicative of, at least one of, communication capability 230 (e.g., Bluetooth, up to 20 m, at a rate of X kbps), processing capability 232 (e.g., Y GHz for archiving data), and/or storage capability 234 (e.g., Z GB) associated with one or more of the computing device(s) 108. In some implementations, communication capability 230, processing capability 232, and/or storage capability 234 can be described in terms of standard units (e.g., MIPS for processing capability).

Additionally, and/or alternatively, the one or more set(s) of data 220 can be indicative of a price associated with one or more of the computing device(s) 108 performing computational task 210. By way of example, computing device(s) 108 can be configured to advertise a price associated with the utilization of its computational resource(s) to perform, at least a portion of, a data archiving procedure. The price can be based, at least in part, on the demand for the computational resources and/or the time in which computing device(s) 108 will be within communication range 212. Set(s) of data 220 can include a tuple indicating at least the price, as well as, communication capability 230, processing capability 232, storage capability 234, time required to perform, at least a portion of, computational task 210, etc. In some implementations, electronic modular component(s) 104 can be configured to negotiate the price.

Electronic modular component(s) 104 can be configured to determine a potential benefit 236 to modular electronic device 102 associated with the performance of computational task 210 by one or more of the computing device(s) 108. For example, potential benefit 236 to modular electronic device 102 can include an increase in at least one computational resource 110 associated with one or more electronic modular component(s) 104 of modular electronic device 102. In some implementations, potential benefit 236 to modular electronic device 102 can include an increase in, at least one of, a second communication capability 11A, a second processing capability 110B, or a second storage capability 110C associated with modular electronic device 102. By way of example, in the event that computational task 210 is a data archiving procedure, potential benefit 236 can be associated with an increase in the communication capability, the processing capability, and/or the storage capability of modular electronic device 102 as a result of reducing primary storage consumption by modular electronic device 102 via the data archiving procedure.

In some implementations, potential benefit 236 of computational task 210 can be a financial benefit. For example, computational task 210 can include mining bit coin. At least one potential benefit associated with this task can be an increase in real currency (e.g., an increase in dollars of a bank account) that can be accomplished by performing the bit coin mining procedure.

Electronic modular component(s) 104 can be configured to determine whether to perform, at least a portion of, computational task 210 with one or more of the computing device(s) 108 based, at least in part, on set(s) of data 220 and/or potential benefit 236 to modular electronic device 102. For instance, electronic modular component(s) 104 can be configured to determine whether it would be beneficial to perform computational task 210 using the computational resource(s) of computing device(s) 108. In some implementations, electronic modular component(s) 104 can determine that one or more electronic modular component(s) 104 cannot perform, at least a portion of, computational task 210. In some implementations, electronic modular component(s) 104 can be configured to determine that it is not cost-effective to have one or more electronic modular component(s) 104 (e.g., associated with modular electronic device 102) perform a portion of computational task 210. As such, additional computational resources (e.g., of computing device(s) 108) may be required.

For instance, electronic modular component(s) 104 can be configured to weigh the amount of computational resources required for computational task 210 and potential benefit 236 of computational task 210. Electronic modular component(s) 104 can be configured to determine an amount of computational resource(s) associated with one or more of the computing device(s) 108 to be used in the performance of computational task 210. This determination can be based, at least in part, on one or more set(s) of data 220. As described above, electronic modular component(s) 104 can be configured to determine potential benefit 236 to modular electronic device 102 associated with the performance of computational task 210. Electronic modular component(s) 104 can be configured to compare the amount of computational resources associated with one or more of the computing device(s) 108 to be used in the performance of computational task 210 and potential benefit 236 to modular electronic device 102.

By way of example, computational task 210 can include a data archiving procedure. Electronic modular component(s) 104 can determine that it would require 10 units of communication (e.g., bandwidth), 10 units of processing, and 200 units of storage to perform a data archiving procedure. Electronic modular component(s) 104 can determine that the storage capability of electronic modular device 102 would increase by 300) units as a result of the data archiving procedure. Electronic modular component(s) 104 can compare the amount of resources needed for the performance of the data archiving procedure (e.g., 10 units of communication, 10 units of processing, 200 units of storage) to potential benefit 236 (e.g., 300 unit increase in storage).

Electronic modular component(s) 104 can be configured to coordinate the performance of computational task 210 such that, at least a portion of, computational task 210 can be performed by one or more of the computing device(s) 108. This can occur, for instance, when potential benefit 236 outweighs the amount of computational resource(s) to be used in the performance of computational task 210. For example, electronic modular component(s) 104 can determine that the potential benefit of the data archiving procedure (e.g., related to increasing the storage capability by 300 units) outweighs the amount of resources needed to perform the data archiving procedure. Accordingly, electronic modular component(s) 104 can coordinate the performance of the data archiving procedure such that, at least a portion of, the data archiving procedure is performed by one or more of the computing device(s) 108.

To coordinate the performance of computational task 210, electronic modular component(s) 104 can be configured to divide or partition computational task 210 into one or more tasklets (e.g., a unit of work for computational task 210). For example, a tasklet can specify one or more operation(s) to be performed on a certain set of data associated with computational task 210. In some implementations, electronic modular component(s) 104 can be configured to coordinate the performance of computational task 210 by allocating tasklets associated with computational task 210 among computing device(s) 108 and/or electronic modular component(s) 104. The tasklets can be allocated based, at least in part, on the computational resource(s), communication capability, processing capability, and/or storage capability of computing device(s) 108 and/or electronic modular component(s) 104. For example, in some implementations, computational task 210 can be performed entirely by computing device(s) 108. In some implementations, a first portion of computational task 210 can be performed by one or more of the electronic modular component(s) 104 and a second portion of computational task 210 can be performed by one or more of the computing device(s) 108.

In some implementations, electronic modular component(s) 104 can utilize a score-comparison based analysis to determine whether to have computing device(s) 108 perform, at least a portion, of computational task 210. For example, electronic modular component(s) 104 can be configured to determine a first score 240 associated with one or more of the computing device(s) 108. First score 240 can be based, at least in part, on the one or more set(s) of data 220 associated with the one or more computational resource(s) of one or more of the computing device(s) 108. First score 240 can be indicative of the amount of resources that would be required for computing device(s) 108 to perform, at least a portion of, computational task 210. By way of example, first score 240 can be based, at least in part, on the amount of communication (e.g., 10 units), processing (e.g., 10 units), and/or storage resources (e.g., 200 units) that would be required to perform the data archiving procedure.

Electronic modular component(s) 104 can be configured to determine a second score 242 associated with computational task 210. Second score 242 can be based, at least in part, on potential benefit 236 to modular electronic device 102 associated with the performance of computational task 210. By way of example, second score 242 associated with a data archiving procedure can be based, at least in part, on an increase in the amount of storage capability (and/or a reduction in primary storage consumption) of electronic modular device 102 (e.g., 300 units), upon completion of the data archiving procedure. In another example, in the event that computational task 210 is associated with a financial gain (e.g., as a result of mining bit coin), second score 242 can be associated with an increase in account value associated with a user of electronic modular device 102 after performing computational task 210 (e.g., mining bit coin).

Electronic modular component(s) 104 can be configured to compare first score 240 associated with one or more of the computing device(s) 108 to second score 242 associated with computational task 210. Electronic modular component(s) 104 can be configured to determine whether to perform computational task 210 based, at least in part, on the comparison of first score 240 and second score 242. Electronic modular component(s) 104 can be configured to coordinate the performance of computational task 210 such that, at least a portion of, computational task 210 can be performed by one or more of the computing device(s) 108 when second score 242 outweighs first score 240. For example, in the event that first score 240 (e.g., indicating the resources to be used in performing the data archiving procedure) is outweighed by second score 242 (e.g., indicating the increase in storage gained by performing the data archiving procedure), electronic modular component(s) 104 can determine to perform the data archiving procedure.

Additionally, and/or alternatively, electronic modular component(s) 104 can be configured to utilize software applications of computing device(s) 108 to perform, at least a portion of, computational task 210. For instance, electronic modular component(s) 104 can be configured to communicate with computing device(s) 108 and remotely use the software on computing device(s) 108 to perform computational task 210. By way of example, electronic modular component(s) 104 can be configured to remotely use software to encrypt and/or decrypt certain data. In some implementations, the software can be made available on demand such as via a pay-per-use mechanism. Additionally, and/or alternatively, access to the software can be provided in different tiers. A first tier can provide the requesting module a more limited set of rights and/or number of uses, while a second tier can provide a more expansive set of rights and/or number of uses. In some implementations, computing device(s) 108 and/or electronic modular component(s) 104 can be configured to send a communication (e.g., via network 250) to a developer 260 of the software (e.g., a server associated with the developer) informing developer 260 of the software's use by electronic modular component(s) 104. In this way, developer 260 can attempt to collect revenue for use of the software.

Figure 3:
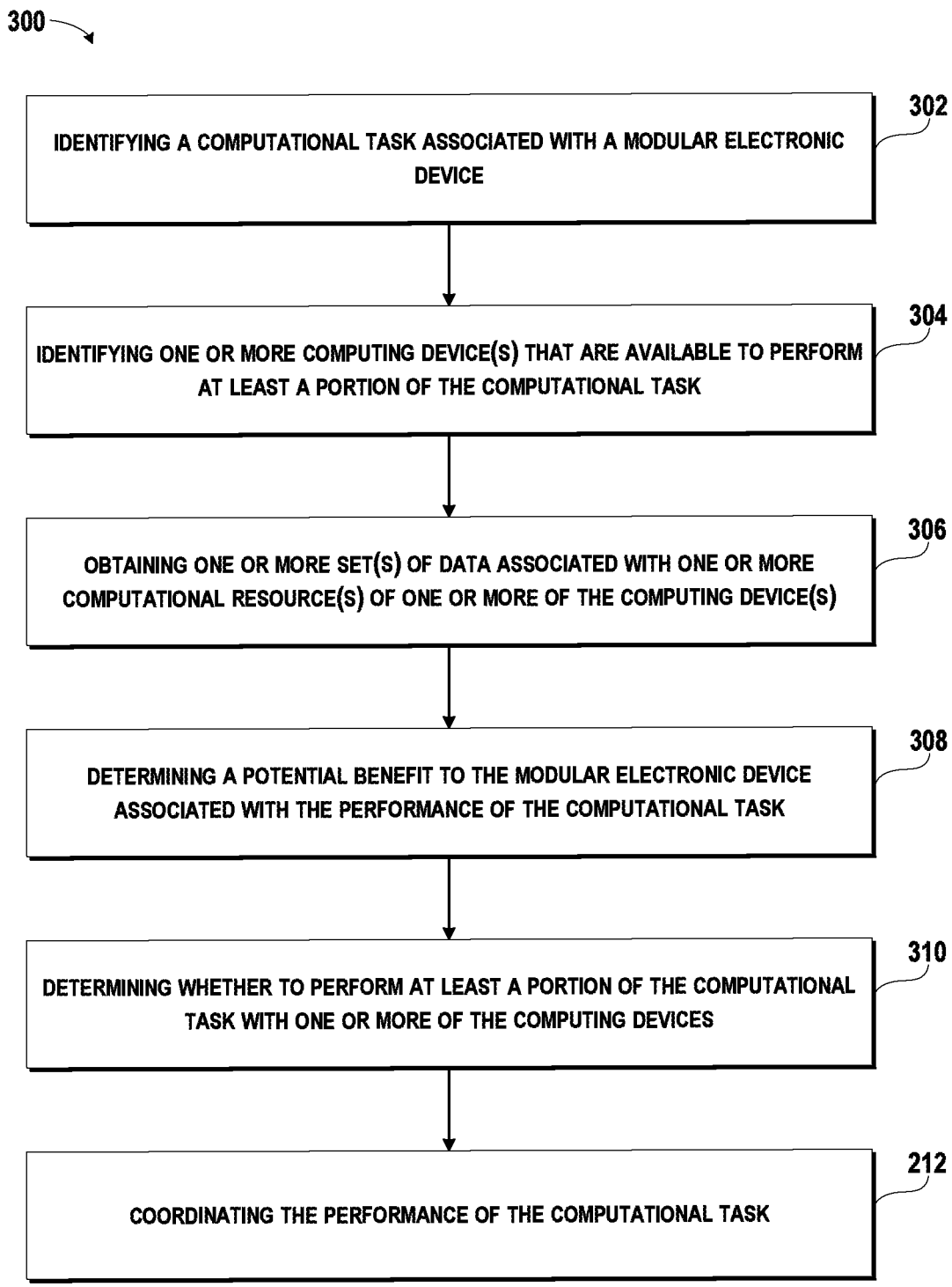
FIG. 3 depicts a flow diagram of an example method of managing task performance for a modular electronic device according to example embodiments of the present disclosure.

FIG. 3 depicts a flow diagram of an example method 300 of managing task performance for a modular electronic device according to example embodiments of the present disclosure. Method 300 can be implemented by one or more electronic modular component(s), such as electronic modular component(s) 104. In addition, FIG. 3 depicts steps performed in a particular order for purposes of illustration and discussion. The steps of any of the methods discussed herein can be adapted, rearranged, expanded, omitted, or modified in various ways without deviating from the scope of the present disclosure.

At (302), method 300 can include identifying a computational task associated with a modular electronic device. For instance, electronic modular component(s) 104 can identify computational task 210 associated with modular electronic device 102, as described above. Computational task 210 can include, for example, a data archiving procedure and/or a bit coin mining procedure.

At (304), method 300 can include identifying one or more computing device(s) that are available to perform, at least a portion of, the computational task. For instance, electronic modular component(s) 104 can identify one or more computing device(s) 108 that are available to perform, at least a portion of, computational task 210. In some implementations, computing device(s) 108 can be associated with at least one electronic device that is different from modular electronic device 102. As described above, electronic modular component(s) 104 can identify computing device(s) 108 as available based, at least in part, on computing device(s) 108 being within communication range 212, request(s) 214 for availability, advertisements, etc.

At (306), method 300 can include obtaining one or more set(s) of data associated with one or more computational resource(s) of one or more of the computing device(s). For instance, electronic modular component(s) 104 can obtain one or more set(s) of data 220 associated with one or more computational resource(s) of one or more of the computing device(s) 108. The set(s) of data 220 can be indicative of at least one of a communication capability 230 (e.g., Bluetooth, up to 20 m, at a rate of X kbps), processing capability 232 (e.g., Y GHz for archiving data), and/or storage capability 234 (e.g., Z GB) associated with one or more of the computing device(s) 108.

At (308), method 300 can include determining a potential benefit to the modular electronic device associated with the performance of the computational task. For instance, electronic modular component(s) 104 can determine potential benefit 236 to modular electronic device 102 associated with the performance of computational task 210 by one or more of the computing device(s) 108. For example, potential benefit 236 to modular electronic device 102 can include an increase in at least one of the communication capability, the processing capability, and/or the storage capability associated with modular electronic device 102 (e.g., as a result of a data archiving procedure). In some implementations, potential benefit 236 of computational task 210 can be a financial benefit (e.g., an increase in dollars of a bank account due to mining bit coin).

At (310), method 300 can include determining whether to perform, at least a portion of, the computational task with one or more of the computing device(s). For instance, electronic modular component(s) 104 can determine whether to perform, at least a portion of, computational task 210 with one or more of the computing device(s) 108. This can be based, at least in part, on the one or more set(s) of data 220 associated with the computational resource(s) of one or more of the computing device(s) 108 and/or potential benefit 236 to modular electronic device 102.

By way of example, electronic modular component(s) 104 can determine first score 240 associated with one or more of the computing device(s) 108. First score 240 can be based, at least in part, on one or more set(s) of data 220 indicating the resources required for the performance of computational task 210 (e.g., data archiving procedure). Electronic modular component(s) 104 can determine second score 242 associated with computational task 210 based, at least in part, on potential benefit 236 to modular electronic device 102 (e.g., an increase storage capability). Electronic modular component(s) 104 can compare first score 240 to second score 242 and can determine whether to perform computational task 210 (e.g., data archiving procedure) based, at least in part, on the comparison of first score 240 and second score 242.

At (312), the method 300 can include coordinating the performance of the computational task. For instance, electronic modular component(s) 104 can coordinate the performance of computational task 210 such that, at least a portion of, computational task 210 can be performed by one or more of the computing device(s) 108. In some implementations, a first portion (e.g., one or more tasklet) of computational task 210 can be performed by one or more of the electronic modular component(s) 104 and a second portion (e.g., one or more other tasklets) of computational task 210 can be performed by one or more of the computing device(s) 108. In this way, modular electronic device 102 can leverage the resources of other computing device(s) to perform tasks that are beneficial to modular electronic device 102.

Figure 4:
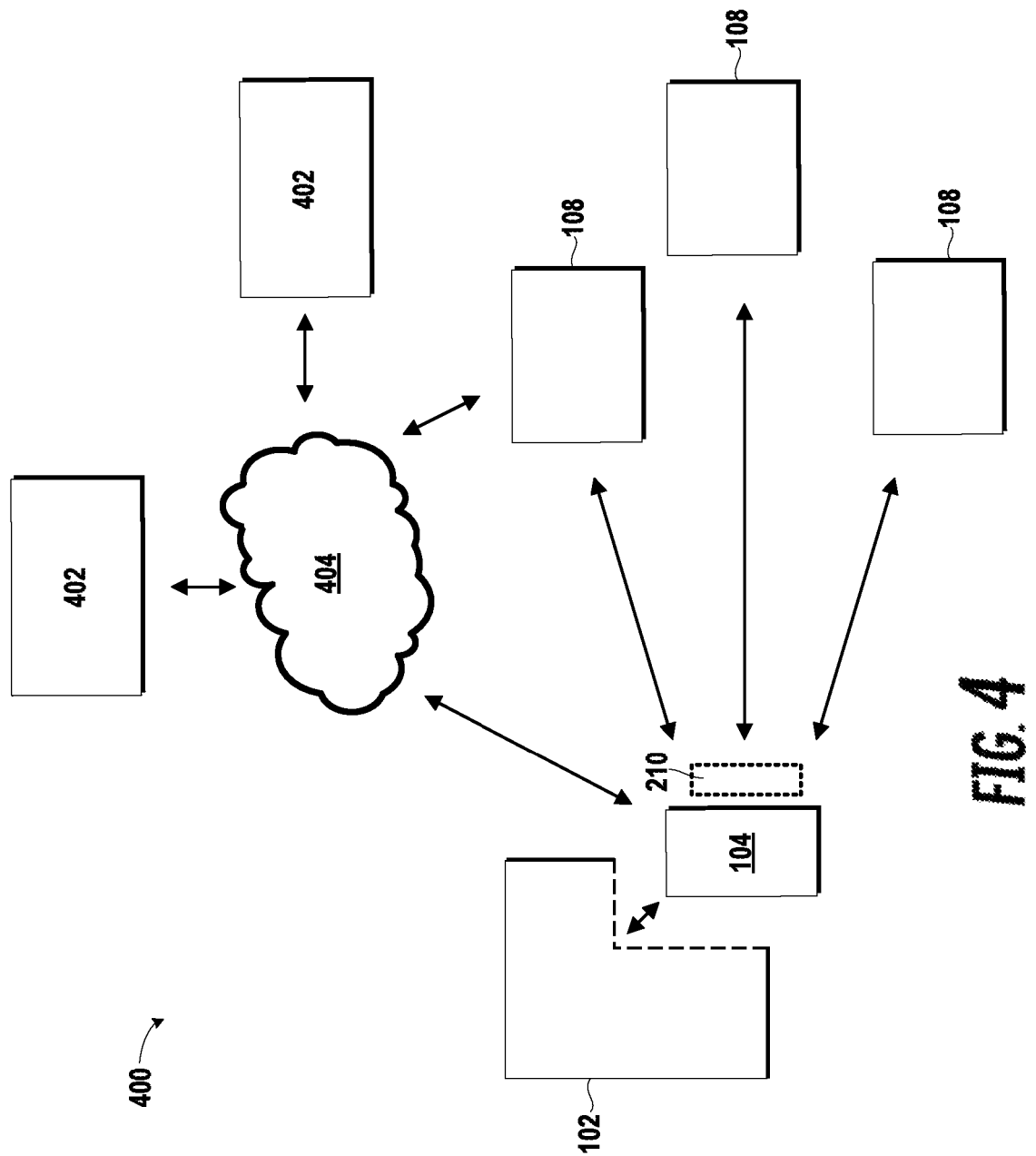
FIG. 4 depicts an example system according to example embodiments of the present disclosure.

FIG. 4 depicts an example system 400 according to example embodiments of the present disclosure. In some implementations, electronic modular component(s) 104 can be customized based, at least in part, on the computational tasks being performed. For example, system 400 can include components similar to that of FIG. 2, as well as a central server 402. Central server 402 can be configured to monitor (e.g., via a network 404) the frequencies and/or types of computational tasks (e.g., 210) being performed by electronic modular component(s) 104 and/or computing device(s) 108 under the coordination of electronic modular component(s) 104. Based the frequencies and/or types of computational tasks, central server 402 can communicate with a manufacturer 406 (e.g., computing device associated therewith) to have a particular type of electronic modular component(s) 104 created for modular electronic device 102.

For example, electronic modular component(s) 104 can frequently coordinate the performance of a data archiving procedure. Central server 402 can monitor this activity of electronic modular component(s) 104. Central server 402 can communicate with manufacturer 406 to create one or more new electronic modular component(s) that are capable of performing the data archiving procedure for modular electronic device 102 (e.g., without additional computing device(s)). In this way, the electronic modular device 102 can be customized based, at least in part, on computational tasks.

Additionally, and/or alternatively, central server 402 can monitor electronic modular component(s) on a wider, more global scale. For example, central server 402 can monitor the performance of computational tasks of electronic modular component(s) associated with several electronic modular devices. Based, at least in part, on the tendencies, frequencies, and/or types of tasks being performed (and/or coordinated) by the electronic modular component(s), central server 402 can communicate with manufacturer 406 to create one or more new electronic modular component(s) that are capable of performing the more frequently performed computational tasks. In this way, availability of needed electronic modular component(s) can be increased, potentially extending the lifespan of an electronic modular device.

FIG. 5 depicts an example system 500 according to example embodiments of the present disclosure. The system 500 can be used to implement the methods and systems according to example aspects of the present disclosure. The system 500 can include modular electronic device 102 having electronic modular component(s) 104, which can communicate with computing device(s) 108, developer 250, central server 402, and/or manufacturer 406 via network 510. The system 500 can be implemented using a client-server architecture and/or other suitable architectures.

As shown, modular electronic device 102 can include one or more electronic modular component(s) 104. Electronic modular component(s) 104 can include one or more processor(s) 512. Processor(s) 512 can include any suitable processing device, such as a microprocessor, microcontroller, integrated circuit, logic device, or other suitable processing device. Electronic modular component(s) 104 can include one or more memory device(s) 514. Memory device(s) 514 can include one or more computer-readable media, including, but not limited to, non-transitory computer-readable media. RAM, ROM, hard drives, flash drives, or other memory devices.

Memory device(s) 514 can store information accessible by processor(s) 512, including computer-readable instructions 516 that can be executed by processor(s) 512. The instructions 516 can be any set of instructions that when executed by processor(s) 512, cause processor(s) 512 to perform operations. In some implementations, instructions 516 can be executed by processor(s) 512 to cause processor(s) 512 to perform operations, such as the operations and functions for which electronic modular component(s) 104 are configured, as described herein, and/or any other operations or functions of electronic modular component(s) 104 (e.g., method 300)). For example, the operations can include identifying computational task 210, obtaining one or more sets of data 220 indicative of at least one of communication capability 230, processing capability 232, or storage capability 234 associated with one or more computing device(s) 108 that are available to perform, at least a portion of, computational task 210, and determining whether to have, at least a portion of, computational task 210 performed by one or more computing device(s) 108, based at least in part, on one or more sets of data 220, as further described herein. Instructions 516 can be software written in any suitable programming language or can be implemented in hardware. Additionally, and/or alternatively, instructions 516 can be executed in logically and/or virtually separate threads on processor 512.

Memory device(s) 514 can also store data 518 that can be retrieved, manipulated, created, and/or stored by processor(s) 512. Data 518 can include, for instance, information associated with one or more computational task(s), computing device(s) 108, computational resource(s), communication capability, processing capability, storage capability, task frequency, tendencies, and/or any other data and/or information described herein. Data 518 can be stored in one or more database(s). The one or more database(s) can be connected to electronic modular component(s) 104 by a high bandwidth LAN or WAN, and/or can also be connected to electronic modular component(s) 104 through various other suitable networks. The one or more database(s) can be split up so that they are located in multiple locales.

Electronic modular component(s) 104 can also include a network interface 520 used to communicate with one or more other components of system 500. Network interface 520 can include any suitable components for interfacing with one more networks, including for example, transmitters, receivers, ports, controllers, antennas, or other suitable components. One or more of the components (e.g., 512, 514, 516, 518, 520) can be included in housing 105 of electronic modular component(s) 104.

Modular electronic device 102 can include various input/output devices 522 for providing and receiving information from a user, such as a touch screen, touch pad, data entry keys, speakers, and/or a microphone suitable for voice recognition. For instance, modular electronic device 102 can have a display device for presenting a user interface according to example aspects of the present disclosure.

Network 510 can be any type of communications network, such as a local area network (e.g. intranet), wide area network (e.g. Internet), cellular network, or some combination thereof. Network 510 can also include a direct connection. In general, communications can be carried via network interface 520 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL). Network 510 can also include any of the other networks described herein (e.g., 250, 404).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A modular electronic device including one or more electronic modular components, wherein the modular electronic device comprises:
   one or more processors and one or more memory devices that include computer-readable instructions that when executed by the one or more processors cause the modular electronic device to perform operations, the operations comprising:
- identifying a computational task associated with the modular electronic device;
- identifying one or more computing devices that are available to perform at least a portion of the computational task;
- obtaining one or more sets of data associated with one or more computational resources of one or more of the computing devices, wherein the sets of data are indicative of at least one of a communication capability, a processing capability, and a storage capability associated with one or more of the computing devices;
- determining a potential benefit to the modular electronic device associated with the performance of the computational task by one or more of the computing devices;
- determining whether it is cost-effective to have the one or more electronic modular components of the modular electronic device perform at least the portion of the computational task; and
- determining whether to perform at least the portion of the computational task with one or more of the computing devices based at least in part on the one or more sets of data associated with the one or more computational resources, the potential benefit to the modular electronic device, and the determination as to whether it is cost-effective to have the one or more electronic modular components of the modular electronic device perform at least the portion of the computational task.

2. The modular electronic device of claim 1, wherein the operations further comprise:
determining that the one or more electronic modular components cannot perform at least the portion of the computational task.

3. The modular electronic device of claim 1, wherein the one or more computing devices are associated with one or more electronic devices that are physically separate from the modular electronic device.

4. The modular electronic device of claim 1, wherein identifying the one or more computing devices that are available to perform at least the portion of the computational task comprises determining that the electronic modular components are in a communication range with the one or more computing devices.

5. The modular electronic device of claim 1, wherein identifying the one or more computing devices that are available to perform at least the portion of the computational task comprises:
- sending one or more requests for information indicative of an availability of one or more of the computing devices to perform at least the portion of the computational task; and
- receiving a response comprising information indicative of the availability of one or more of the computing devices to perform at least the portion of the computational task.

6. The modular electronic device of claim 1, wherein obtaining one or more sets of data associated with the one or more computational resources of one or more of the computing devices comprises:
- sending one or more requests for one or more sets of data associated with the one or more computational resources of one or more of the computing devices; and
- receiving the one or more sets of data associated with the one or more computational resources of one or more of the computing devices.

7. The modular electronic device of claim 1, wherein the operations further comprise:
coordinating the performance of the computational task such that at least the portion of the computational task is performed by one or more of the computing devices.

8. The modular electronic device of claim 1, wherein determining whether it is cost-effective to have the one or more electronic modular components of the modular electronic device perform at least the portion of the computational task comprises:
- determining a first score associated with one or more of the computing devices, wherein the first score is based at least in part on the one or more sets of data associated with the one or more computational resources of one or more of the computing devices;
- determining a second score associated with the computational task, wherein the second score is based at least in part on the potential benefit to the modular electronic device;
- comparing the first score associated with one or more of the computing devices to the second score associated with the computational task; and
- wherein determining whether to perform at least the portion of the computational task with one or more of the computing devices comprises:
- determining whether to perform the computational task based at least in part on the comparison of the first score and the second score.

9. The modular electronic device of claim 8, wherein the operations further comprise:
coordinating the performance of the computational task such that at least the portion of the computational task is performed by one or more of the computing devices when the second score associated with the computational task outweighs the first score associated with the one or more computing devices.

10. The modular electronic device of claim 8, wherein the one or more sets of data are indicative of a price associated with one or more of the computing devices performing the computational task.

11. The modular electronic device of claim 1, wherein the potential benefit to the modular electronic device comprises an increase in at least one of a second communication capability, a second processing capability, or a second storage capability associated with the modular electronic device.

12. A computer-implemented method of managing task performance for a modular electronic device, the method comprising:
- identifying, by one or more electronic modular components of a modular electronic device, a computational task associated with the modular electronic device;
- identifying, by the one or more electronic modular components, one or more computing devices that are available to perform at least a portion of the computational task, wherein the computing devices are associated with at least one electronic device that is different from the modular electronic device;
- obtaining, by the one or more electronic modular components, one or more sets of data associated with one or more computational resources of one or more of the computing devices, wherein the sets of data are indicative of at least one of a communication capability, a processing capability, or a storage capability associated with one or more of the computing devices;

determining, by the one or more electronic modular components, a potential benefit to the modular electronic device associated with the performance of the computational task by one or more of the computing devices;

determining whether it is cost-effective to have the one or more electronic modular components of the modular electronic device perform at least the portion of the computational task; and determining, by the one or more electronic modular components, whether to perform at least the portion of the computational task with one or more of the computing devices based at least in part on the one or more sets of data associated with the one or more computational resources, the potential benefit to the modular electronic device, and the determination as to whether it is cost-effective to have the one or more electronic modular components of the modular electronic device perform at least the portion of the computational task.

13. The computer-implemented method of claim 12, further comprising:

coordinating, by the one or more electronic modular components, the performance of the computational task such that at least the portion of the computational task is performed by one or more of the computing devices.

14. The computer-implemented method of claim 12, further comprising:

coordinating, by the one or more electronic modular components, the performance of the computational task such that a first portion of the computational task is performed by one or more of the electronic modular components and a second portion of the computational task is performed by one or more of the computing devices.

15. The computer-implemented method of claim 12, wherein determining whether it is cost-effective to have the one or more electronic modular components of the modular electronic device perform at least the portion of the computational task comprises:

determining, by the one or more electronic modular components, a first score associated with one or more of the computing devices, wherein the first score is based at least in part on the one or more sets of data associated with the one or more computational resources of one or more of the computing devices;

determining, by the one or more electronic modular components, a second score associated with the computational task, wherein the second score is based at least in part on the potential benefit to the modular electronic device;

comparing, by the one or more electronic modular components, the first score to the second score; and wherein determining, by the one or more electronic modular components, whether to perform at least the portion of the computational task with one or more of the computing devices comprises:

determining, by the one or more electronic modular components, whether to perform the computational task based at least in part on the comparison of the first score and the second score.

16. An electronic modular component for a modular electronic device, the electronic modular component comprising:

a module housing;

one or more processors included in the module housing; and one or more memory devices included in the module housing, the one or more memory devices storing computer-readable instructions that when executed by the one or more processors, cause the one or more processors to perform operations, the operations comprising:

identifying a computational task;

obtaining one or more sets of data indicative of at least one of a communication capability, a processing capability, or a storage capability associated with one or more computing devices that are available to perform at least a portion of the computational task;

determining a potential benefit to the modular electronic device associated with the performance of the computational task;

determining whether it is cost-effective to have the one or more electronic modular components of the modular electronic device perform at least the portion of the computational task; and determining whether to have at least the portion of the computational task performed by the one or more computing devices based at least in part on the one or more sets of data, the potential benefit to the modular electronic device associated with the performance of the computational task, and the determination as to whether it is cost-effective to have the one or more electronic modular components of the modular electronic device perform at least the portion of the computational task.

17. The electronic modular component of claim 16, wherein determining whether it is cost-effective to have the one or more electronic modular components of the modular electronic device perform at least the portion of the computational task comprises determining that it is not cost-effective to have one or more electronic modular components associated with the modular electronic device perform the portion of the computational task, and wherein the operations further comprise:

coordinating the performance of the computational task such that at least the portion of the computational task is performed by one or more of the computing devices.

18. The electronic modular component of claim 16, determining whether it is cost-effective to have the one or more electronic modular components of the modular electronic device perform at least the portion of the computational task comprises:

determining an amount of computational resources associated with one or more of the computing devices to be used in a performance of the computational task based at least in part on the one or more sets of data; and comparing the amount of computational resources associated with one or more of the computing devices to be used in the performance of the computational task and the potential benefit to the modular electronic device associated with the performance of the computational task.

19. The electronic modular component of claim 18, wherein the operations further comprise:

coordinating the performance of the computational task such that at least a portion of the computational task is performed by one or more of the computing devices when the potential benefit to the modular electronic device outweighs the amount of computational resources associated with one or more of the computing devices to be used in the performance of the computational task.

20. The electronic modular component of claim 18, wherein the potential benefit to the modular electronic device comprises at least one of an increase in a computational resource associated with one or more electronic modular components of the modular electronic device.

* * * * *